United States Patent
Critsinelis et al.

(10) Patent No.: US 9,863,571 B2
(45) Date of Patent: Jan. 9, 2018

(54) APPARATUS, SYSTEMS AND METHODS FOR THERMAL MANAGEMENT OF SUBSEA PIPELINE

(71) Applicant: Chevron U.S.A. Inc., San Ramon, CA (US)

(72) Inventors: Antonio Critsinelis, Kingwood, TX (US); Sid Mebarkia, Sugar Land, TX (US); Marliee R. Myres, Houston, TX (US); Steven Louis Johnson, Houston, TX (US); Brady Lee Kirchof, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 113 days.

(21) Appl. No.: 14/975,948

(22) Filed: Dec. 21, 2015

(65) Prior Publication Data
US 2017/0175946 A1 Jun. 22, 2017

(51) Int. Cl.
*F16L 9/18* (2006.01)
*F16L 59/14* (2006.01)
(Continued)

(52) U.S. Cl.
CPC ............ *F16L 59/14* (2013.01); *B29C 63/105* (2013.01); *F16L 53/008* (2013.01); *F16L 59/029* (2013.01);
(Continued)

(58) Field of Classification Search
CPC .............................. F16L 59/143; F16L 59/153
(Continued)

(56) References Cited

U.S. PATENT DOCUMENTS 3,853,149 A * 12/1974 Stine ...................... F16L 59/153
138/111
4,590,108 A * 5/1986 Nippe ................... F16L 59/027
138/104
(Continued)

FOREIGN PATENT DOCUMENTS

WO 2008053251 5/2008
WO 2009083937 7/2009
(Continued)

*Primary Examiner* — Patrick F Brinson
(74) *Attorney, Agent, or Firm* — Karen R. DiDomenicis (57) ABSTRACT

Disclosed are apparatus, systems and methods for maintaining desired thermal properties of a flowing hydrocarbon fluid in a subsea pipeline. An insulating layer including a plurality of elongated hollow elements containing an insulation material can surround the pipeline. The apparatus can be located on a seabed and connected to a source of hydrocarbon fluid at one end and to a facility for processing hydrocarbon fluid at another end. One method includes spirally winding an elongated hollow element containing an insulation material around the subsea pipeline. One method includes wrapping the subsea pipeline with a connecting layer which includes surface protrusions protruding radially outwards. An insulating layer having surface features reversibly engageable with the surface protrusions of the connecting layer can be reversibly attached to the connecting layer by engaging the surface features of the at least one elongated hollow element with the surface protrusions of the connecting layer.

34 Claims, 10 Drawing Sheets

(51) Int. Cl.
    *F16L 59/02*     (2006.01)
    *F16L 53/00*     (2006.01)
    *F17D 1/18*     (2006.01)
    *F17D 3/01*     (2006.01)
    *B29C 63/10*     (2006.01)
    *B29L 23/00*     (2006.01)

(52) U.S. Cl.
    CPC ............... *F17D 1/18* (2013.01); *F17D 3/01* (2013.01); *B29K 2995/0015* (2013.01); *B29L 2023/225* (2013.01)

(58) Field of Classification Search
    USPC ........ 138/149, 129, 148, 114, 144; 428/36.5
    See application file for complete search history.

(56) References Cited

U.S. PATENT DOCUMENTS

| | | | | |
|---|---|---|---|---|
| 4,824,705 A * | 4/1989 | Persson | ............... | F16L 58/1054 138/140 |
| 5,307,842 A * | 5/1994 | Lequeux | ............... | F16L 59/153 138/130 |
| 6,116,290 A * | 9/2000 | Ohrn | ............... | F16L 59/143 138/113 |
| 6,227,250 B1 * | 5/2001 | Coutarel | ............... | F16L 59/153 138/129 |
| 6,827,110 B2 * | 12/2004 | Watkins | ............... | F16L 59/143 138/112 |
| 8,651,148 B2 * | 2/2014 | Jespersen | ............... | F16L 59/22 138/112 |
| 8,991,437 B2 * | 3/2015 | Bourlart | ............... | F16L 59/135 138/104 |
| 9,004,174 B2 | 4/2015 | Mebarkia et al. | | |
| 2007/0163666 A1 | 7/2007 | Lee et al. | | |
| 2012/0261019 A1 | 10/2012 | Glejbol | | |
| 2013/0068340 A1 * | 3/2013 | Chakkalakal | ............... | F16L 59/143 138/149 |
| 2014/0238648 A1 | 8/2014 | Lehr et al. | | |

FOREIGN PATENT DOCUMENTS

| | | |
|---|---|---|
| WO | 2009109950 | 9/2009 |
| WO | 2011079845 | 7/2011 |
| WO | 2014130889 | 8/2014 |

\* cited by examiner

APPARATUS, SYSTEMS AND METHODS FOR THERMAL MANAGEMENT OF SUBSEA PIPELINE

FIELD

The present disclosure relates generally to thermal management of subsea pipeline and more specifically to apparatus, systems and methods useful for providing thermal management for subsea pipeline conveying hydrocarbon-containing production fluids.

BACKGROUND

As is well known in the field of oil and gas production, it is important to ensure hydrocarbon production fluids flowing in subsea pipeline are maintained at a temperature to prevent the formation of wax and hydrates which could interfere with fluid flow. It is recognized that there are a limited number of viable options for thermal insulation of flowlines also referred to herein as pipeline for use in deep water, subsea conditions. Any insulation must be able to withstand the high temperatures and pressures encountered by pipeline in a subsea environment. For example, the temperature of the hydrocarbon-containing fluids produced from a subterranean reservoir can range from 60 to 300° C. Subsea flowlines are under high external pressure that increases with increasing depth, e.g., up to about 5,000 psi (34.5 MPa) at water depths in the range of 10,000 ft to 12,000 ft (3050 to 3660 m).

One recognized conventional technology for thermal management of subsea pipeline is the use of "wet insulation," in which a syntactic foam material is directly applied to the exterior of the pipeline. Wet insulation technology has the advantages of relative simplicity and low cost. However, wet insulation is not suitable for all applications. Wet insulation is often not suitable for applications having a tieback distance greater than about 12 miles (19 km). This constraint is attributed to the limitation of the wet insulation U-value. The U-value, also referred to as thermal transmittance or overall heat transfer coefficient, is a measure of the effectiveness of a material as an insulator. The lower the U-value, the better the material is as a heat insulator. Wet insulation materials generally have U-values from 1.84 to 2.89 W/(m$^2$×K) at 3 in insulation coating thickness. It becomes increasingly difficult to achieve U-values below 2 W/(m$^2$×K) with wet insulation as water depth increases, as the insulation material must resist the hydrostatic pressure and therefore must contain fewer voids. A thicker insulation coating may slightly increase the tieback distance; however, a thicker insulation may be damaged during offshore installation using a reel-lay installation vessel.

Another recognized conventional technology for thermal management of subsea pipeline is "pipe-in-pipe" technology, which is usually used for longer tiebacks, i.e., greater than about 12 miles. Pipe-in-pipe technology utilizes dry insulation between an inner steel pipe (flow line or flow pipe) and an outer steel pipe (carrier pipe) to protect the dry insulation from water egress and pressure. The flow line carries the hydrocarbon coming out of the well at high temperature (e.g., 60-300° C.) and at high pressure, e.g., up to about 70 MPa. The carrier pipe is designed independent of the flow line to withstand the external hydrostatic pressure that proportionately increases with depth, e.g., about 28 MPa at 2800 m depth. In deep and ultra-deep water oil and gas exploration, crude oil or gas is extracted from below the sea floor via a pipeline system to the water surface. It is important to maintain the temperature of the hot crude oil or gas flowing in the pipe above about 30-50° C. depending on the composition of the hydrocarbons (e.g., crude oil or natural gas). Maintaining a temperature in this range prevents flow restrictions or clogging due to formation of hydrates or wax, which can occur via cooling of the crude oil or gas by cold water as the hydrocarbons flow from the underwater well to the production plant on the surface. Also, if the well must be capped for maintenance or due to inclement weather, it is highly desired to keep the temperature of the hydrocarbon inside the pipe and other parts of the pipeline systems (e.g., a Christmas tree or subsea tree, risers, etc.) above precipitation temperature for as long as possible to minimize or avoid expensive and time-consuming de-clogging processes before resuming the production operation. These are the so-called flow assurance requirements for the underwater pipe-in-pipe configuration. The pipe-in-pipe configuration has been the traditional method of choice to satisfy the flow assurance requirements of the deep water exploration. This technology has the advantages of low thermal conductivity and low thermal transmittance or U-value, e.g., less than 2 W/(m$^2$×K), and longer possible tieback distances, e.g. up to about 30 miles (48 km). However, pipe-in-pipe technology has a number of disadvantages. Because of the large amount of material and the number of parts involved, pipe-in-pipe type flowlines have higher material and fabrication costs. Installation using pipe-in-pipe technology is complex and expensive. The heavy weight of the pipeline generally requires larger installation vessels. Large hang off weight is a concern to be managed during installation. Furthermore, the pipeline may not be able to be installed with reel-lay vessels. These challenges are exacerbated as higher temperature production fluids are identified in offshore oil and gas reservoirs targeted for development, resulting from the greater temperature differential between the hot inner pipe and the cold outer pipe. In such applications, the outer diameter of the outer pipe must be increased to allow for greater insulation. The amount of pipeline that can be reeled, if at all, is limited due to the large outer diameter. Furthermore, current pipe-in-pipe designs are known to have severe limitations at depths greater than 1000 m.

There exists a need for an alternative technology for thermal management of subsea pipeline that would avoid the aforementioned problems. It would be desirable to have a technology that would include the advantages of pipe-in-pipe technology combined with easier installation and lower cost.

SUMMARY

In one aspect, provided is an apparatus for maintaining desired thermal properties of a flowing hydrocarbon fluid in a subsea pipeline. The apparatus includes a pipeline for conveying fluids, the pipeline having a length, and at least one insulating layer surrounding the pipeline. Each insulating layer includes a plurality of elongated hollow elements arranged side-by-side in a single layer in parallel with respect to one another. Each of the elongated hollow elements has a length extending along at least a portion of the length of the pipeline. Each of the elongated hollow elements is sealed at its ends and contains an insulation material there within. A method is also provided in which the apparatus is provided in a subsea environment and fluid is flowed through the subsea pipeline. A system is also provided for maintaining desired thermal properties of a flowing hydrocarbon fluid in a subsea pipeline in which the apparatus is located on a seabed, the pipeline has a first end connected to a source of hydrocarbon fluid and a second end connected to a facility for processing hydrocarbon fluid.

In another aspect, provided is an apparatus for thermally insulating a subsea pipeline. The apparatus includes an insulating sheet that includes at least one insulation layer. Each insulating layer includes a plurality of elongated hollow elements in which the elongated hollow elements are arranged side-by-side in a single layer in parallel with respect to one another and connected to one another such that the insulating layer is a unitary article. Each of the elongated hollow elements is sealed at its ends and contains an insulation material there within. The insulating sheet is flexible about a theoretical axis parallel to the elongated hollow elements thereby allowing the insulating sheet to be wrapped around a pipeline such that the length of the elongated hollow elements extend along at least a portion of the length of the pipeline.

In another aspect, provided is a method for thermally insulating a subsea pipeline. The method includes wrapping a pipeline having a length with the apparatus for thermally insulating a subsea pipeline such that the length of the elongated hollow elements extends along the length of the pipeline. The apparatus is then surrounded by a protective wrap layer for contacting a subsea environment.

In another aspect, provided is a method for thermally insulating a subsea pipeline. The method includes spirally winding an elongated hollow element containing an insulation material therein around the subsea pipeline at a laydown angle of greater than 0° with respect to a theoretical line perpendicular to the axis of the subsea pipeline such that the elongated hollow element is laid down side-by-side and parallel with respect to previously laid down elongated hollow element to form a single layer of spirally wound elongated hollow element.

In another aspect, provided is a method for thermally insulating a subsea pipeline. The method includes wrapping the subsea pipeline with a connecting layer which includes surface protrusions protruding radially outwards. At least one elongated hollow element containing an insulation material therein and having surface features reversibly engageable with the surface protrusions of the connecting layer is reversibly attached to the connecting layer by engaging the surface features of the at least one elongated hollow element with the surface protrusions of the connecting layer.

In another aspect, provided is a method for fabricating a thermally insulated subsea pipeline. The method includes helically wrapping at least one layer of elongated hollow elements onto a pipeline wherein the elongated hollow elements is arranged side-by-side in a single layer in parallel with respect to one another and wherein the elongated hollow elements contain an insulation material to form an insulating layer; and wrapping a protective wrap layer around the insulating layer for contacting a subsea environment.

In yet another aspect, provided is a method for forming a thermally insulated field joint in a subsea pipeline on a floating pipeline installation vessel. The method includes welding two sections of pipeline on the floating pipeline installation vessel to form a joint, wrapping the joint with an insulating sheet, as described above and further herein, such that the length of the elongated hollow elements extend along the length of the joint, and covering the insulating sheet with a protective layer.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

FIGS. 1E-G are perspective drawings illustrating insulating layers for maintaining desired thermal properties of a flowing hydrocarbon fluid in a subsea pipeline according to exemplary embodiments.

FIGS. 3A-3D are cross-sectional drawings of insulating layers for maintaining desired thermal properties of a flowing hydrocarbon fluid in a subsea pipeline according to exemplary embodiments.

FIGS. 4A-4C are perspective drawings illustrating protective layers for apparatus for maintaining desired thermal properties of a flowing hydrocarbon fluid in a subsea pipeline according to exemplary embodiments.

DETAILED DESCRIPTION

Apparatus, systems and methods for maintaining desired thermal properties of a flowing hydrocarbon fluid in a subsea pipeline will be described with reference to the figures herein. The disclosure relates to a subsea pipeline passive thermal management system utilizing multiple small external pressure protecting elongated hollow elements, also referred to herein as tubes or compartments, containing insulation material placed on the outside of a pipeline. The elongated hollow elements can take a variety of forms as described herein. The thermal properties of the system disclosed can approach those of pipe-in-pipe (PIP) systems by taking advantage of insulation properties, but can eliminate the design, installation, contracting and cost challenges associated with PIP.

Figure 1A:
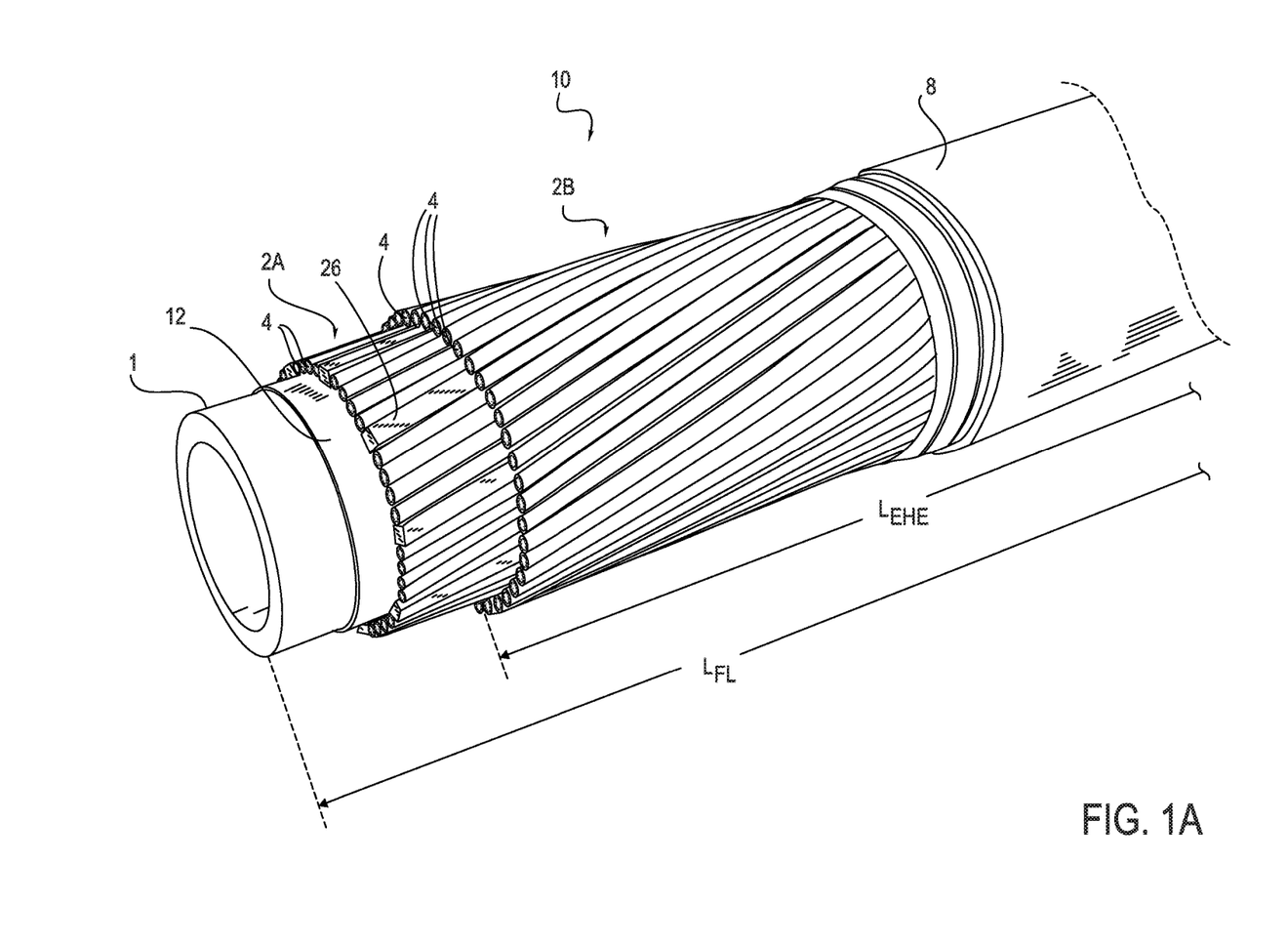
FIGS. 1A and 1B are perspective drawings illustrating apparatus for maintaining desired thermal properties of a flowing hydrocarbon fluid in a subsea pipeline according to exemplary embodiments.
Figure 1B:
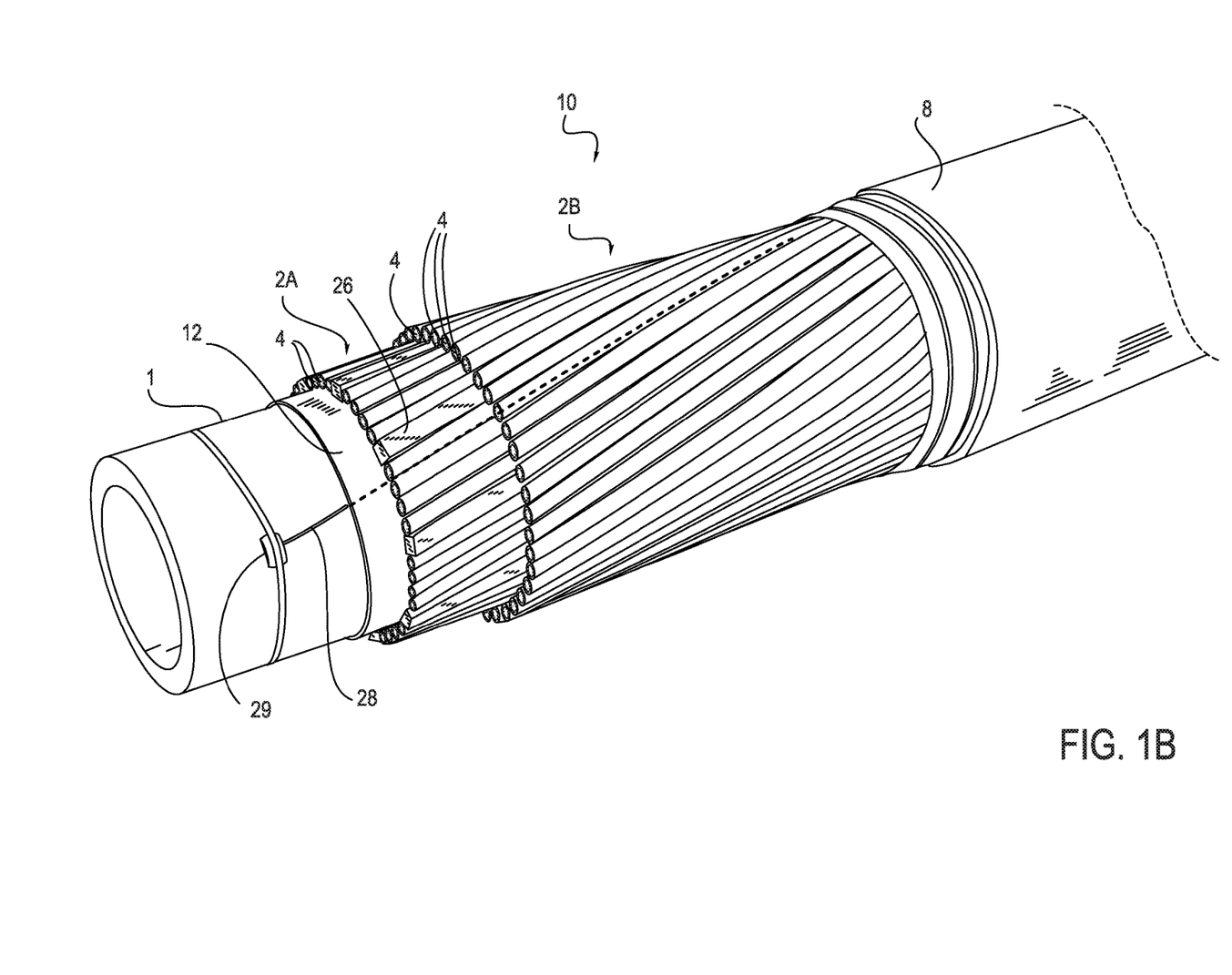
Figure 1C:
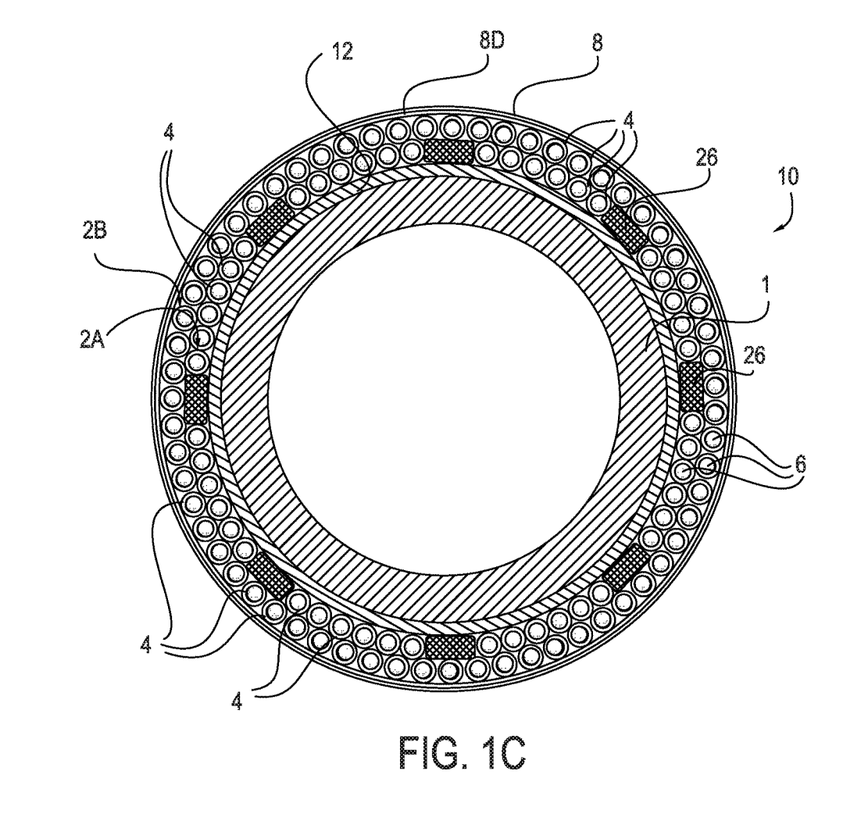
FIGS. 1C and 1D are cross-sectional drawings illustrating apparatus for maintaining desired thermal properties of a flowing hydrocarbon fluid in a subsea pipeline according to exemplary embodiments.
Figure 1D:
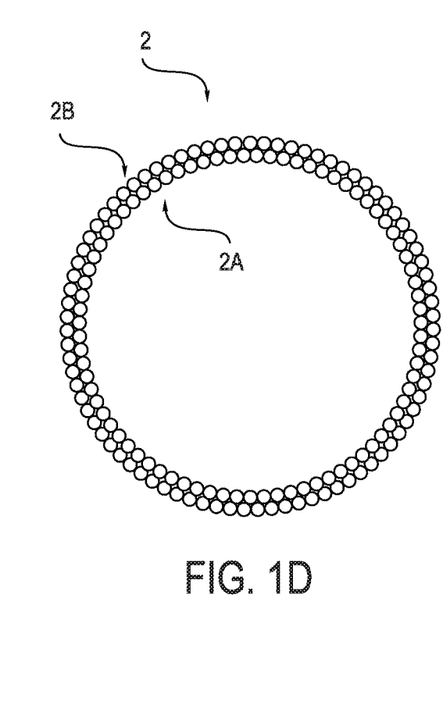
Figure 1E:
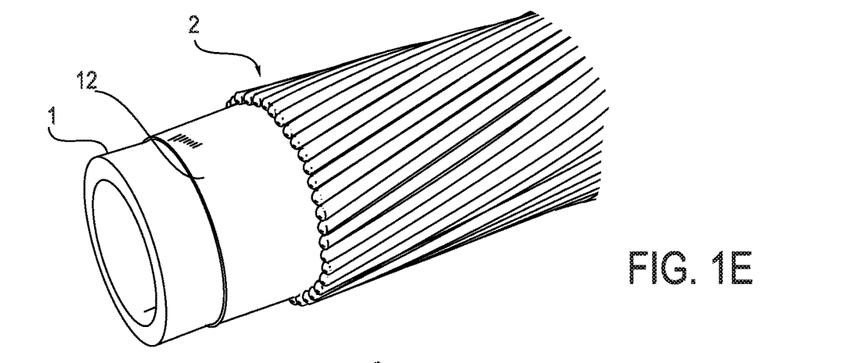
Figure 1F:
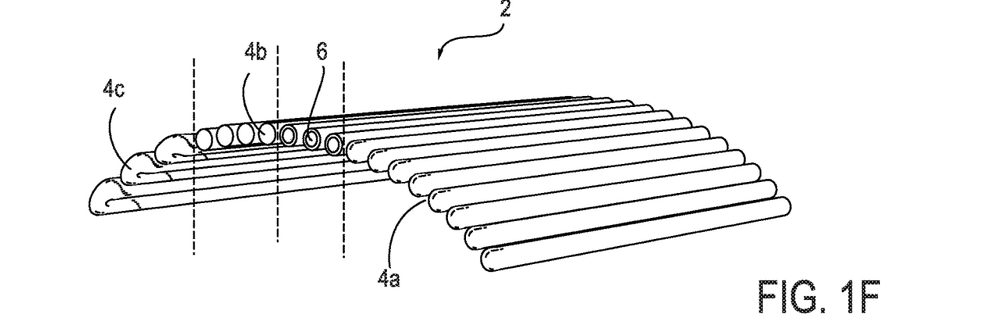
Figure 1G:
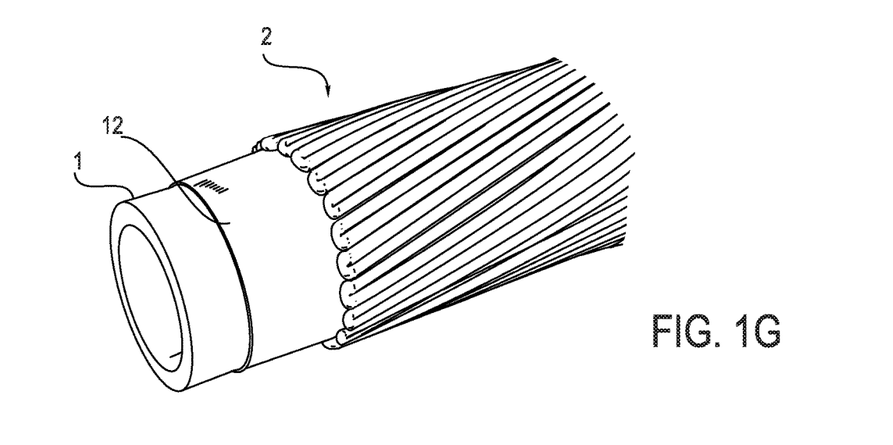

An apparatus 10 for maintaining desired thermal properties of a flowing hydrocarbon fluid in a subsea pipeline will be described with reference to FIGS. 1A-1C. In one embodiment, the apparatus 10 includes a subsea pipeline 1 for conveying fluids, also referred to herein as a pipeline or flowline, the pipeline having a length $L_{FL}$. The pipeline 1 can be a conventional pipeline such as a carbon steel pipeline suitable for use in a subsea environment. At least one insulating layer 2 surrounds the pipeline 1. In some embodiments, as shown in FIGS. 1E and 1G, one insulating layer 2 surrounds the pipeline 1. In other embodiments, two or more insulating layers surround the pipeline. FIGS. 1A-1C illustrate the embodiment in which two insulating layers 2A and 2B are used to surround the pipeline 1, wherein the layer 2A is the innermost layer, i.e., the layer closest to the pipeline 1. Each insulating layer 2, 2A or 2B is formed from a plurality of elongated hollow elements 4 arranged side-by-side in a single layer in parallel with respect to one another. Each of the plurality of elongated hollow elements 4 has a length $L_{EHE}$ extending along at least a portion of the length $L_{FL}$ of the pipeline 1. In one embodiment, the elongated hollow elements 4 can extend along the entire length of the pipeline 1. In another embodiment, not shown, the elongated hollow elements 4 extend only in preselected lengths along the length of the pipeline 1.

The elongated hollow elements 4 can contain an insulation material 6 therein. Each of the elongated hollow elements 4 has ends which are sealed such that the insulation material 6 therein is protected from the environment outside the elongated hollow elements 4. As shown in FIG. 1F, the ends of elongated hollow elements 4 can be sealed in different ways. 4a illustrates a rounded cap; 4b illustrates a flat cap and 4c illustrates an embodiment in which elongated hollow elements 4 are folded over on themselves thus creating a rounded end common to two adjacent elongated hollow elements 4.

In one embodiment, the insulating layer 2, 2A or 2B has an overall heat transfer coefficient U of less than 2 W/m²×K. In one embodiment, the insulation material 6 is in a form that it can be injected into the elongated hollow elements 4. Alternatively, the insulation material can be poured as a liquid, e.g., a curable liquid or a phase change material, into the elongated hollow elements 4, and optionally then cured into a solid. Alternatively, the insulation material can be inserted as a solid or poured as a powder into the elongated hollow elements 4. Suitable insulation materials can include foams, powders, solids, gels, phase-change materials, aerogels and combinations thereof.

Figure 2:
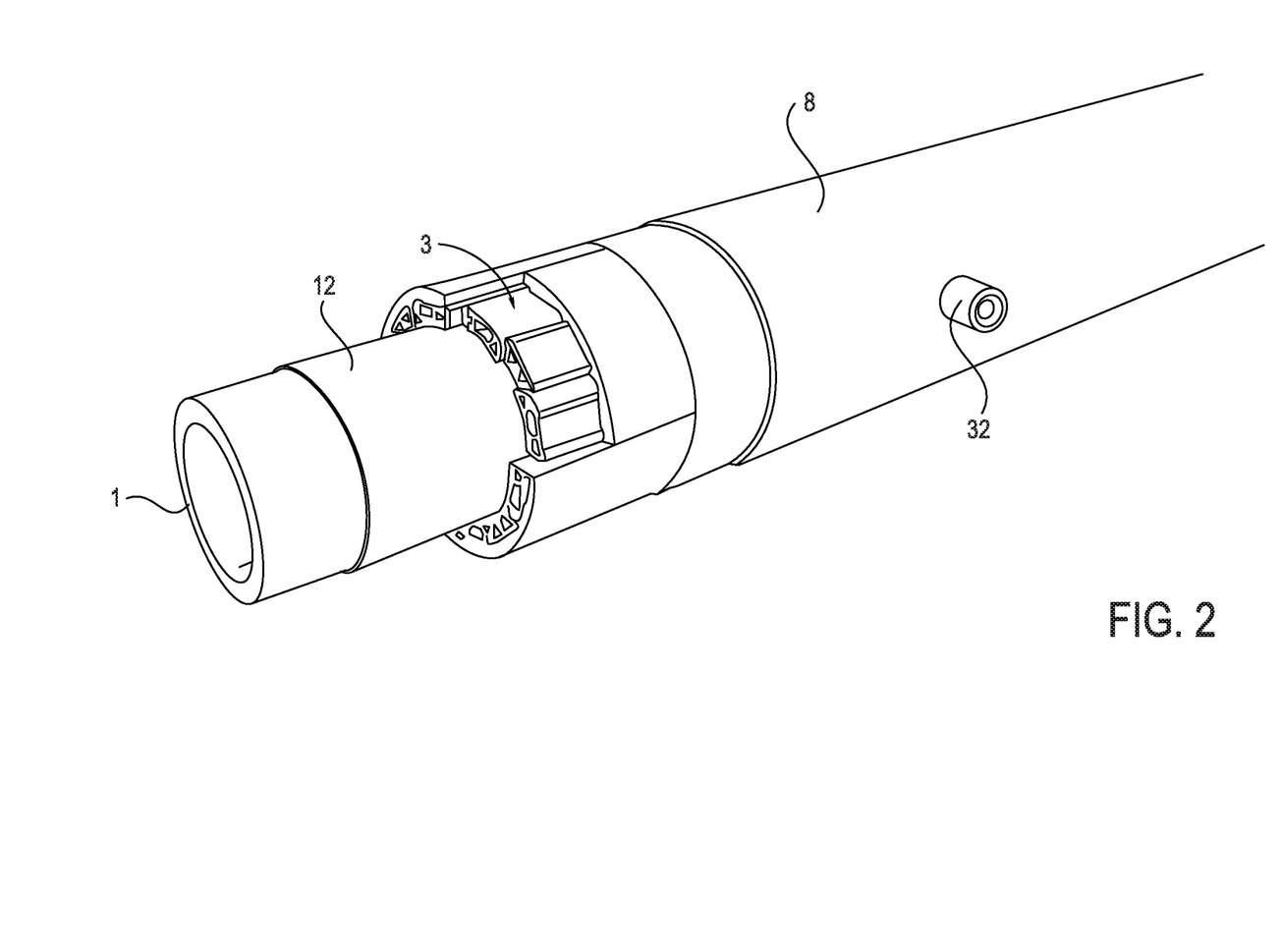
FIG. 2 is a perspective drawing illustrating an apparatus for maintaining desired thermal properties of a flowing hydrocarbon fluid in a subsea pipeline according to another exemplary embodiment.

The elongated hollow elements 4 can take any of a number of forms while still performing the function of enclosing the insulation material 6. For example, the elongated hollow elements 4 can suitably take the form of flexible tubes, as shown in FIGS. 1A-1G. The tubes 4 can have any of a number of cross-sectional shapes. For example, the tubes can be circular, triangular, elliptical, trapezoidal, rectangular, semicircular or semielliptical in cross-section, or they may have any other irregular shape facilitating fabrication and/or installation or useful for increasing hydrostatic resistance in a subsea environment. Alternatively, instead of tubes 4, elongated compartments 3 can be used to contain the insulation material, as shown in FIG. 2. The compartments 3 can have any of a number of cross-sectional shapes. In one example, the compartments 3 can be rectangular. The elongated hollow elements 4 or compartments 3 can extend axially along the length of the pipeline 1, in parallel with the axis of the pipeline 1, or they can be helically wound around the pipeline 1.

Figure 4A:
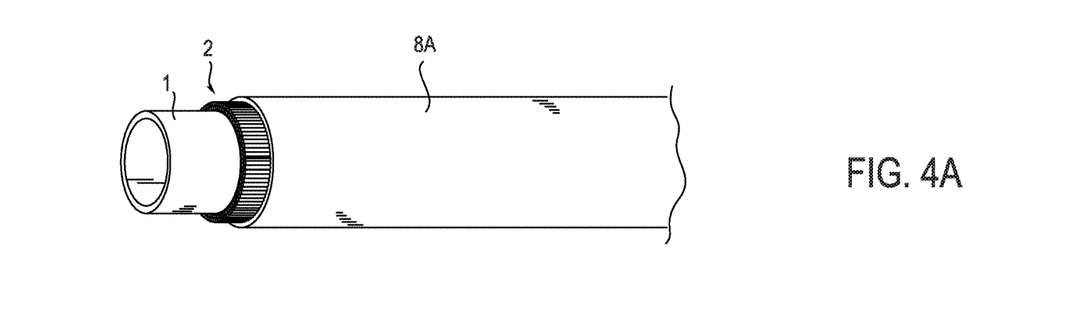
Figure 4B:
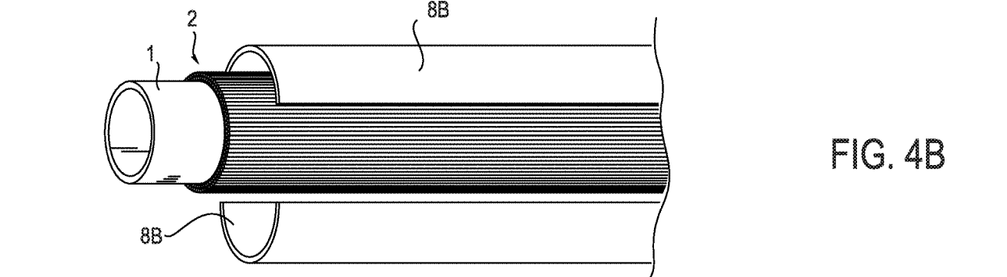
Figure 4C:
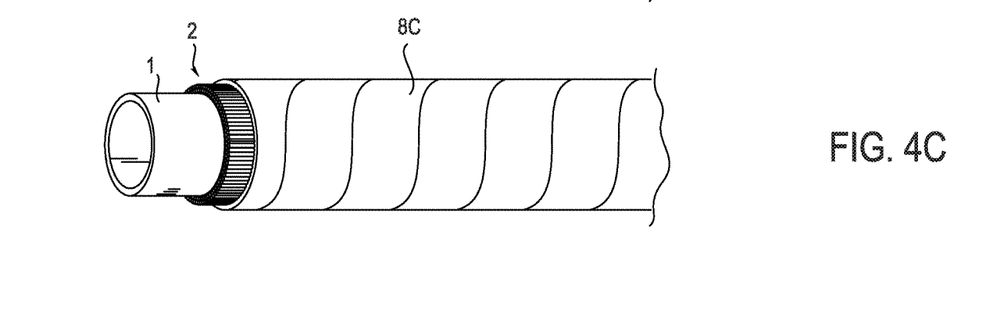

The apparatus 10 can include further optional components. In one embodiment, the apparatus 10 can include a protective layer 8 surrounding the insulating layer(s) 2. The protective layer 8 can be any layer suitable for contacting a subsea environment and protecting the layer(s) 2 which it surrounds. In one embodiment, shown in FIG. 4A, the protective layer 8A is formed by extruding a polymeric layer 8A around the insulating layer(s) 2. As shown in FIG. 4B, in another embodiment, the protective layer is formed by attaching at least two rigid shell elements 8B to one another. As shown in FIG. 4C, in another embodiment, the protective layer 8 is formed by winding a planar flexible tape 8C around the insulating layer(s) 2. In another embodiment, not shown, rather than including one of the above-described protective layers 8, the apparatus can include a protective layer in the form of an encasement pipe. The encasement pipe serves to protect the insulating layer(s) 2 and can be used to hold them in place. The encasement pipe suitably is formed from a composite material that is lighter than steel pipe. The composite material can include composites containing carbon fibers, glass fibers and the like. The combination of the encasement pipe and the elongated hollow elements 4 is sufficient to resist external pressure.

The apparatus 10 can include an optional corrosion protection layer 12 surrounding the pipeline 1 located between the pipeline 1 and the innermost insulating layer 2.

Figure 6:
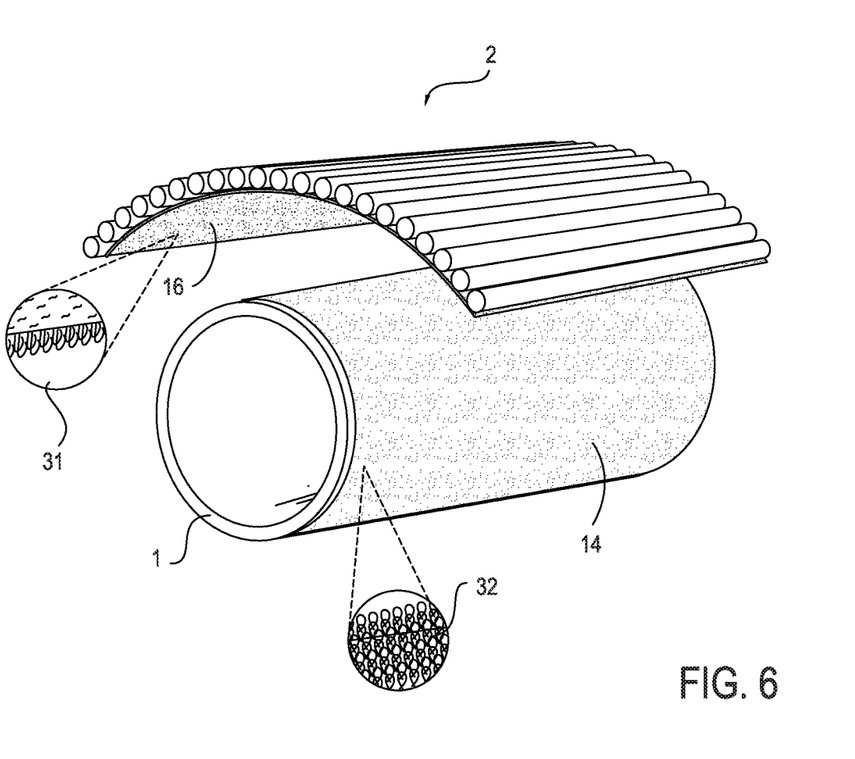
FIG. 6 is an exploded view illustrating a method of attaching an insulating layer to a pipe according to an exemplary embodiment.

In one embodiment, as shown in FIG. 6, in the innermost insulating layer 2 can be reversibly attached to the pipeline 1 by the use of a connecting layer 14 surrounding the pipeline 1. The connecting layer 14 has surface protrusions 32 designed to protrude radially outwards from the pipeline 1 when the connecting layer 14 is in place on the pipeline 1. The surface protrusions 32 are engageable with surface features 31 of the innermost insulating layer 2. The surface features 31 are provided on the inner surface of the innermost insulating layer 2. In one embodiment, the surface protrusions 32 and the surface features 31 are loops and hooks, respectively, engageable with one another. In another embodiment, not shown, the surface protrusions 32 and the surface features 31 are hooks and loops, respectively, engageable with one another. In one embodiment, not shown, the surface protrusions and the surface features are rigid connecting elements sized and shaped to be reversibly engageable with one another.

Figure 5A:
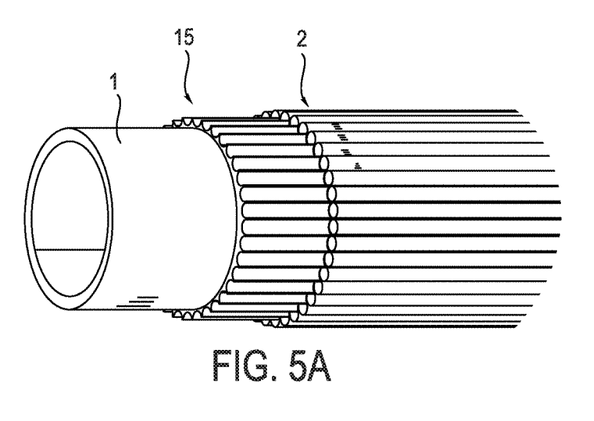
FIG. 5A is a perspective drawing illustrating an apparatus for maintaining desired thermal properties of a flowing hydrocarbon fluid in a subsea pipeline according to another exemplary embodiment.
Figure 5B:
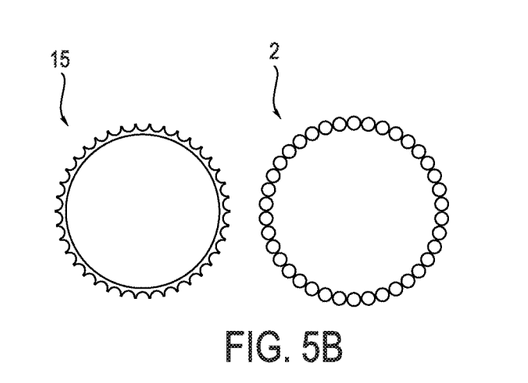
FIG. 5B is a cross-sectional view of the apparatus of FIG. 5A.
Figure 5C:
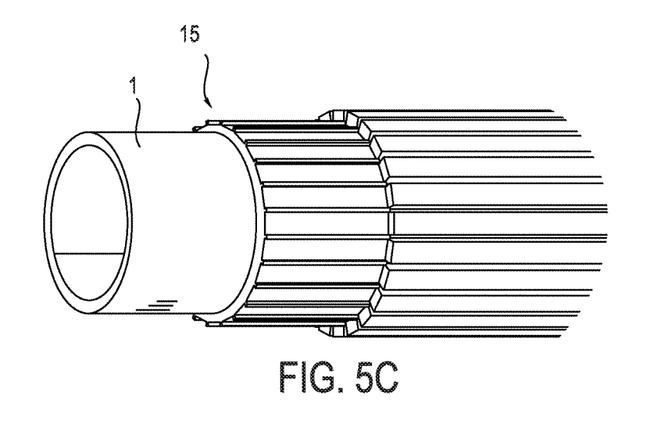
FIG. 5C is a perspective drawing illustrating an apparatus for maintaining desired thermal properties of a flowing hydrocarbon fluid in a subsea pipeline according to another exemplary embodiment.
Figure 5D:
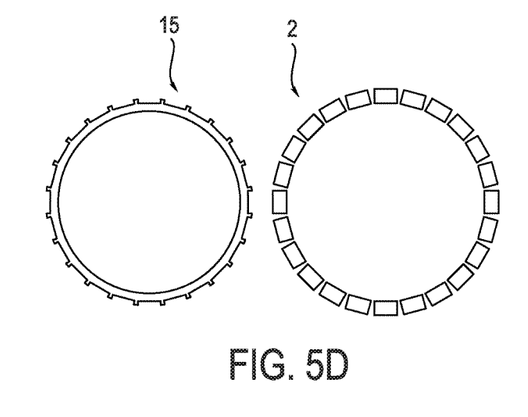
FIG. 5D is a cross-sectional view of the apparatus of FIG. 5C.

In one embodiment, as shown in FIG. 5A, a connecting layer 15 consists of compartments which are sized and shaped to both contain insulation material and engage with the surface of a complementary insulating layer 2 capable of being reversibly attached to the connecting layer 15. The connecting layer 15 and the complementary insulating layer 2 have surface features respectively sized and shaped to be reversibly engageable with one another. FIG. 5B shows a cross-section of the connecting layer 15 and the complementary insulating layer 2. FIGS. 5C-5D similarly illustrate a connecting layer 15 and a complementary insulating layer 2 having different cross-sectional shapes.

Figure 7:
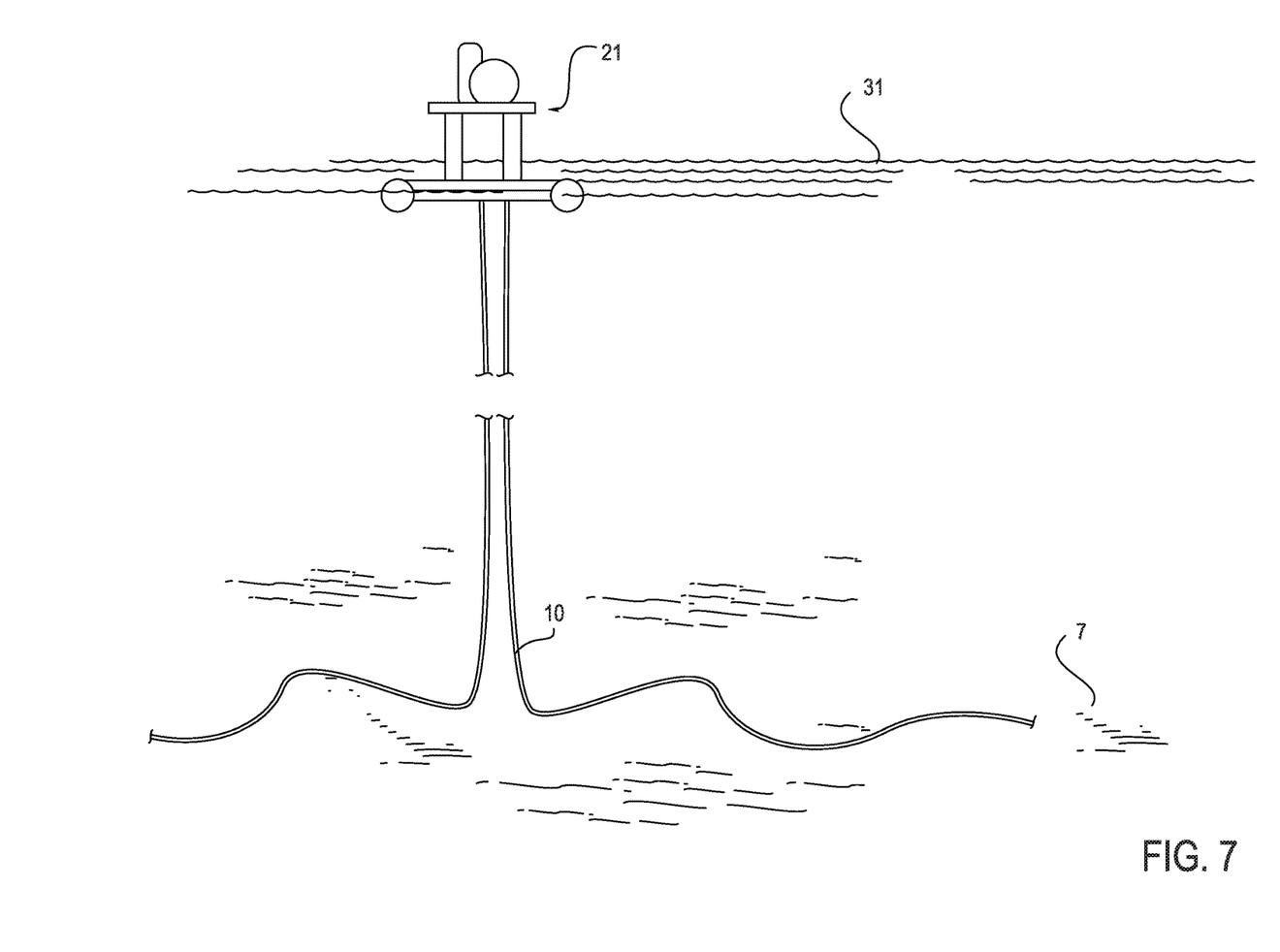
FIG. 7 illustrates a system including an exemplary apparatus for maintaining desired thermal properties of a flowing hydrocarbon fluid in a subsea pipeline according to an embodiment.

As shown in FIG. 7, in one embodiment, the apparatus 10 can be located on a seabed 7 in a subsea environment in a subsea pipeline system. Hydrocarbon containing production fluids flow through the pipeline 1 within the apparatus 10 from one end of the pipeline connected to a source of hydrocarbon containing fluid to another end of the pipeline connected to a facility for processing the hydrocarbon containing fluid, such as a facility on a platform 21 at the water surface 31. The system can optionally further include a monitoring system for monitoring a condition associated with the pipeline 1. For instance, pipeline wall thickness, stress and/or strain, vibrations, temperature, pressure, pipeline movement, pipeline position, indications of leaking of the production fluid, and the like can be monitored by a monitoring device 29 such as a sensor located at a desired point in the pipeline 1, as shown in FIG. 1B. Suitable monitoring devices 29 can include ultrasound emitter (for monitoring wall thickness), strain gauge (for monitoring deflection, vibration, internal pressure), thermistor/temperature gauge, accelerometer (for monitoring inclination/position), fiber optic cable (for monitoring strain, temperature), acoustic emitter (for monitoring positioning, leak detection). The monitoring device 29 can be connected to the monitoring system by use of a cable 28 in one of the insulating layer(s) of the apparatus 10. The cable 28 can be a communications cable, an electrical cable, or a combination thereof. The cable 28 can extend along at least a portion of the length of the pipeline 1. In one embodiment, the cable 28 can pass through one of the elongated hollow elements 4. U.S. Pat. No. 9,004,174 (Mebarkia et al.), the contents of which are herein disclosed by reference, describes a system, apparatus and method for monitoring a subsea pipeline.

The system can optionally include an elongated heating element 26 in one of the insulating layer(s) of the apparatus 10 for providing active heating to the pipeline 1, as shown in FIGS. 1A-1B.

As shown in FIG. 2, in one embodiment, the apparatus 10 can further include a female mating interface 32 in fluid communication with at least one of the elongated hollow elements 4 capable of receiving an ROV hot stab (not shown) for filling the elongated hollow elements 4 with insulation material 6. The female mating interface 32 can be also used for refilling the elongated hollow elements 4 with insulation material 6 after a period of use as needed.

Figures 3A, 3B:
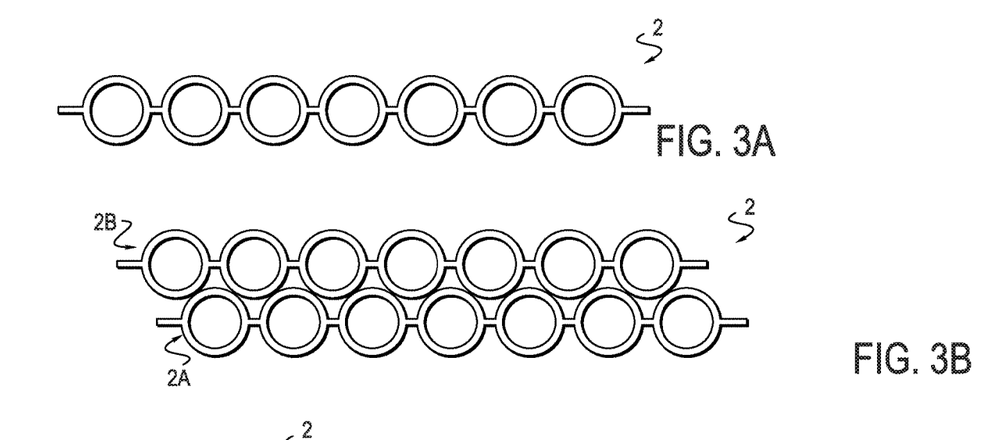
Figure 3C:
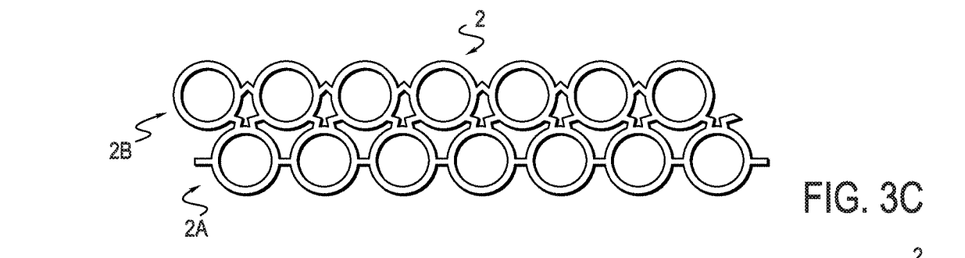
Figure 3D:
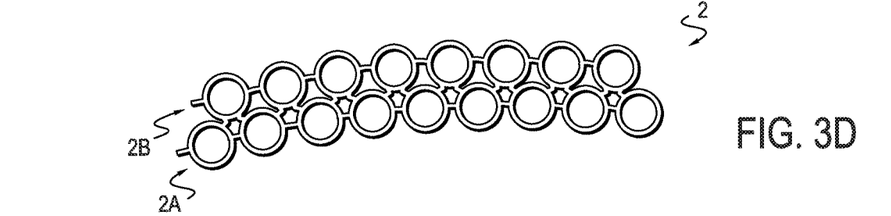

In one embodiment, an apparatus for thermally insulating a subsea pipeline 1 is provided. As shown in FIG. 1F, the apparatus is an insulating sheet 2. The insulating sheet 2 includes at least one layer of a plurality of elongated hollow elements 4 containing insulation material 6 therein. Each of the elongated hollow elements 4 has a length $L_{EHE}$ and ends that are sealed such that the insulation material is protected from the environment external to the elongated hollow elements 4. The elongated hollow elements 4 are arranged side-by-side in a single layer in parallel with respect to one another. Adjacent elongated hollow elements 4 are connected to one another such that the insulating sheet 2 is a unitary article. The unitary article can have any convenient width, and any convenient number of elongated hollow elements 4. As shown in FIGS. 3A-3D, the adjacent elongated hollow elements 4 can be connected to one another by web material there between. In one embodiment, the plurality of adjacent elongated hollow elements 4 with the web material there between can be formed by extruding the insulating sheet 2 from a polymeric material. In another embodiment, the plurality of adjacent elongated hollow elements 4 with the web material there between can be formed by connecting the separately formed elongated hollow elements 4. Once the elongated hollow elements 4 are formed, insulation material 6 can be injected into the elongated hollow elements 4. In one embodiment, the insulating layers 2A and 2B are attached to one another. The insulating layers 2A and 2B can be attached to one another by mechanical bonding, mechanical attachment, chemical bonding, adhesive bonding or a combination thereof. Once the insulating sheet 2 is wrapped around the pipeline 1 it can be surrounded with a protective layer 8 for contacting a subsea environment and protecting the insulating sheet 2. As shown in FIG. 3B, the insulating sheet 2 can be two separate layers 2A and 2B adjacent each other. In this embodiment, the insulating layers 2A and 2B are separately wrapped around the pipeline 1 without being bonded to one another. In this case, a layer of tape (not shown) can optionally be used to temporarily hold the insulating layers 2A and 2B in place before a protective outer layer 8 is applied.

The insulating sheet 2 is flexible about a theoretical axis parallel to the elongated hollow elements 4 thereby allowing the insulating sheet 2 to be wrapped around the pipeline 1 such that the length of the elongated hollow elements 4 extends along at least a portion of the length of the pipeline 1. In other words, the insulating sheet 2 is flexible when wrapped around the pipeline 1 with the elongated hollow elements 4 extending in parallel with the axis of the pipeline 1.

In each of the embodiments disclosed herein, the plurality of elongated hollow elements 4 can be formed from a material selected from thermoplastic material, such as polyurethane or polyethylene, carbon fiber composite material, glass fiber composite material, and combinations thereof. In each of the embodiments disclosed herein, the insulation material 6 can be formed from any of a foam, powder, solid, gel, phase-change material, aerogel and combinations thereof.

As shown in FIGS. 1A-1C, the apparatus 10 optionally includes an elongated heating element 26 extending along at least a portion of the length of the pipeline 1 for providing active heating to the pipeline 1. The elongated heating element 26 can be included within the single layer of elongated hollow elements 4. The apparatus 10 can optionally further include a cable 28. Cable 28 can be a communications cable, an electrical cable or a combination thereof extending along at least a portion of the length of the pipeline 1. The cable 28 can pass through one of the elongated hollow elements 4. In one embodiment, the cable 28 connects a monitoring system (not shown) with a monitoring device 29 for monitoring a condition as desired associated with the pipeline 1.

In one embodiment, a method for thermally insulating a subsea pipeline 1 having an axis and a length is provided. In one embodiment, the method includes spirally winding an elongated hollow element 4 having an insulation material 6 therein around the subsea pipeline 1 at a laydown angle of greater than 0° with respect to a theoretical line perpendicular to the axis of the subsea pipeline 1. In other words, the elongated hollow element 4 is wound around the subsea pipeline 1 at an angle so that as the elongated hollow element 4 is wound, it will progressively wrap along the length of the subsea pipeline 1. The elongated hollow element 4 is laid down side-by-side and parallel with respect to previously laid down elongated hollow element 4 to form a single layer of spirally wound elongated hollow element 4. In one embodiment, multiple elongated hollow elements 4 can be wound simultaneously in such a way that the multiple elongated hollow elements 4 are arranged side-by-side in a single layer in parallel with respect to one another as they are wound. At least one layer of a plurality of elongated hollow elements 4 can be wrapped. Any suitable equipment and process for winding an elongated element onto a cylindrical object can be used as would be apparent to one of ordinary skill in the art. For example, the elongated hollow elements 4 can be on spools positioned near the pipeline 1 and fed onto the pipeline 1 by rotating around the pipeline 1. In another example, the elongated hollow elements 4 can be on spools positioned near the pipeline 1 and fed onto the pipeline 1 by rotating the pipeline 1.

A protective layer 8 for contacting a subsea environment can then be applied to cover the single layer or multiple layers of spirally wound elongated hollow element 4. As described above, the protective layer 8 can be an extruded layer, can be formed of at least two rigid shell elements attachable to one another, or can be a planar flexible tape able to be wound to form the protective layer. In one embodiment, the subsea pipeline 1 can further be wrapped with a corrosion protection layer prior to spirally winding the elongated hollow element 4.

In one embodiment, another method is provided for fabricating a thermally insulated subsea pipeline 1 having an axis and a length. The subsea pipeline 1 is wrapped with a connecting layer 14 as described above having surface protrusions protruding radially outwards. At least one elongated hollow element 4 having surface features reversibly engageable with the surface protrusions and containing insulation material 6 therein is provided. The elongated hollow element(s) 4 is then reversibly attached to the connecting layer 14 by positioning the surface features of the hollow element 4 opposite the surface protrusions of the connecting layer 14 and applying pressure to cause the surface features and the surface protrusions to engage one another. The elongated hollow element(s) 4 can be attached individually, or in the form of elongated hollow element(s) 4 connected to one another. In one embodiment, an insulating sheet 2 as described above can be provided with surface features reversibly engageable with the surface protrusions of the connecting layer and the insulating sheet 2 can be attached in this manner.

The above-described methods for fabricating a thermally insulated subsea pipeline 1 can be advantageously performed in a subsea pipeline fabrication yard also known as a spool base. In such case, the subsea pipeline 1 is prepared in long straight sections prior to being loaded onto an installation vessel for transportation to an installation site.

In one embodiment, a method is provided for forming a thermally insulated field joint in a subsea pipeline 1 on a floating pipeline installation vessel. Such field joints can be made from the vessel during pipeline installation or repair. The method includes welding two sections of pipeline 1 on the floating pipeline installation vessel to form a joint having a length. The joint is then wrapped with a section of insulating sheet 2 as described above such that the length of the plurality of elongated hollow elements 4 extend along the length of the joint. The insulating sheet 2 is then covered with a protective layer 8.

When the apparatus and systems disclosed herein are used in a subsea environment and production fluids are flowed through the pipeline, thermal properties comparable to PIP systems can be attained. Advantageously, weight per unit length can range from approximately 40% to 60% of a comparable PIP system. The weight advantage results from the eliminating the outer steel pipe of the PIP system. In addition to the weight reduction, the installation process can be simplified by eliminating the outer steel pipe. This system will reduce the overall outside diameter and weight of the installed pipeline as compared to a system utilizing PIP. Wet insulation thicknesses typically approach several inches, however this system can significantly reduce the required thickness for the same given thermal performance by taking advantage of properties of the insulation material. Compared to a PIP system, the diameter will be significantly less by eliminating the outer steel pipe required in a PIP system. Reduction in the thickness and the average density of the materials utilized will also significantly reduce the weight of the system. Reductions in diameter and weight help to overcome design challenges by reducing hang off tensions. Furthermore, a greater number of installation vessels can be considered, including smaller vessels, thus reducing costs. The amount of pipe that can fit on larger vessels can also be increased, also reducing costs. Subsea pipeline systems having a minimum tieback length of 12 miles will especially benefit from the disclosed apparatus, systems and methods. All of these benefits are expected to lead to significant cost saving in fabrication and installation.

It should be noted that only the components relevant to the disclosure are shown in the figures, and that many other components normally part of a subsea pipeline system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. An apparatus for maintaining desired thermal properties of a flowing hydrocarbon fluid in a subsea pipeline, comprising:
   a. a pipeline for conveying fluids, the pipeline having a length; and
   b. at least one insulating layer surrounding the pipeline such that there is an innermost insulating layer, wherein each insulating layer comprises:
      i. a plurality of elongated hollow elements arranged side-by-side in a single layer in parallel with respect to one another wherein each of the plurality of elongated hollow elements has a length extending along at least a portion of the length of the pipeline and two ends wherein each of the two ends is sealed; and ii. an insulation material within each of the plurality of elongated hollow elements.

2. The apparatus of claim 1, wherein the at least one insulating layer has an overall heat transfer coefficient U of less than 2 W/m$^2$-K.

3. The apparatus of claim 1, further comprising a protective layer surrounding the at least one insulating layer for contacting a subsea environment.

4. The apparatus of claim 1, wherein the at least one insulating layer comprises at least two insulating layers.

5. The apparatus of claim 1, further comprising a corrosion protection layer surrounding the pipeline located between the pipeline and the innermost insulating layer.

6. The apparatus of claim 1, further comprising a connecting layer surrounding the pipeline located between the pipeline and the innermost insulating layer wherein the connecting layer comprises surface protrusions engageable with surface features of the innermost insulating layer for reversibly attaching the innermost insulating layer to the pipeline.

7. The apparatus of claim 1, further comprising a connecting layer surrounding the pipeline located between the pipeline and the innermost insulating layer wherein the connecting layer comprises compartments to contain insulation material and surface features sized and shaped to engage with surface features of the innermost insulating layer such that the connecting layer and the innermost insulating layer can be reversibly attached to one another.

8. An apparatus for thermally insulating a subsea pipeline, comprising:

an insulating sheet comprising at least one insulation layer, wherein each insulating layer comprises:
  a. a plurality of elongated hollow elements wherein each of the plurality of elongated hollow elements has a length and two ends wherein each of the two ends is sealed and wherein the plurality of elongated hollow elements are arranged side-by-side in a single layer in parallel with respect to one another and connected to one another such that the insulating layer is a unitary article; and
  b. an insulation material within each of the plurality of elongated hollow elements;
wherein the insulating sheet is flexible about an axis parallel to the plurality of elongated hollow elements thereby allowing the insulating sheet to be wrapped around a pipeline having a length such that the length of the plurality of elongated hollow elements extend along at least a portion of the length of the pipeline.

9. The apparatus of claim 8, wherein the at least one insulating layer comprises at least two insulating layers wherein the two insulating layers are attached to one another by mechanical bonding, mechanical attachment, chemical bonding, adhesive bonding, or a combination thereof.

10. The apparatus of claim 8, further comprising:

a protective layer adjacent and attached to the insulating sheet for contacting a subsea environment and protecting the insulating sheet.

11. The apparatus of claim 8, wherein the plurality of elongated hollow elements are connected to one another by web material between adjacent elongated hollow elements.

12. The apparatus of claim 1 or claim 8, wherein the plurality of elongated hollow elements comprise a material selected from the group consisting of thermoplastic material, carbon fiber composite material, glass fiber composite material, and combinations thereof.

13. The apparatus of claim 1 or claim 8, wherein the insulation material is selected from the group consisting of foam, powder, solid, gel, phase-change material, aerogel and combinations thereof.

14. The apparatus of claim 1 or claim 8, wherein at least one of the at least one insulating layer further comprises an elongated heating element extending along at least a portion of the length of the pipeline for providing active heating to the pipeline and wherein the elongated heating element is included in the single layer of the plurality of elongated hollow elements.

15. The apparatus of claim 1 or claim 8, wherein at least one of the at least one insulating layer further comprises a cable selected from a communications cable, an electrical cable and combinations thereof extending along at least a portion of the length of the pipeline.

16. The apparatus of claim 1 or claim 8, wherein at least one of the at least one insulating layer further comprises a cable selected from a communications cable, an electrical cable and combinations thereof extending along at least a portion of the length of the pipeline, wherein the cable passes through one of the plurality of elongated hollow elements for connecting a monitoring system with a monitoring device for monitoring a condition associated with the pipeline.

17. A method for thermally insulating a subsea pipeline, comprising:

wrapping a pipeline having a length with the apparatus of claim 8 such that the length of the plurality of elongated hollow elements extend along the length of the pipeline; and surrounding the apparatus of claim 8 with a protective wrap layer for contacting a subsea environment.

18. A method for thermally insulating a subsea pipeline having an axis and a length, comprising:

spirally winding an elongated hollow element around the subsea pipeline at a laydown angle of greater than 0° with respect to a line perpendicular to the axis of the subsea pipeline such that the elongated hollow element is laid down side-by-side and parallel with respect to previously laid down elongated hollow element to form a single layer of spirally wound elongated hollow element;

wherein the elongated hollow element contains an insulation material therein.

19. The method of claim 18, further comprising covering the single layer of spirally wound elongated hollow element with a protective layer for contacting a subsea environment.

20. The method of claim 19, wherein the protective layer is extruded.

21. The method of claim 19, wherein the protective layer comprises at least two rigid shell elements attachable to one another.

22. The method of claim 19, wherein the protective layer comprises a planar flexible tape able to be wound to form the protective layer.

23. The method of claim 18, further comprising wrapping the subsea pipeline with a corrosion protection layer prior to spirally winding the elongated hollow element.

24. A method for thermally insulating a subsea pipeline having an axis and a length, comprising:

wrapping the subsea pipeline with a connecting layer comprising surface protrusions protruding radially outwards;

providing at least one elongated hollow element having surface features reversibly engageable with the surface protrusions and containing insulation material therein; and engaging the surface features of the at least one elongated hollow element with the surface protrusions of the connecting layer thereby reversibly attaching the at least one elongated hollow element to the connecting layer.

25. The method of claim 24, wherein the at least one elongated hollow element comprises at least one insulation layer, wherein each insulating layer comprises:

a. the at least one elongated hollow element wherein each of the at least one elongated hollow element has a length and two ends wherein each of the two ends is sealed and wherein the at least one elongated hollow element are arranged side-by-side in a single layer in parallel with respect to one another and connected to one another such that the insulating layer is a unitary article; and b. an insulation material within each of the at least one elongated hollow element;

wherein the at least one insulation layer is flexible about an axis parallel to the at least one elongated hollow element thereby allowing the at least one insulation layer to be wrapped around a pipeline having a length such that the length of the at least one elongated hollow element extend along at least a portion of the length of the pipeline.

26. A method for flowing fluids through a pipeline, comprising:

providing the apparatus of claim 1 in a subsea environment; and flowing fluid through the pipeline.

27. A method for fabricating a thermally insulated subsea pipeline, comprising:

helically wrapping at least one layer of a plurality of elongated hollow elements onto a pipeline wherein the plurality of elongated hollow elements is arranged side-by-side in a single layer in parallel with respect to one another and wherein the plurality of elongated hollow elements contain an insulation material to form an insulating layer; and wrapping a protective wrap layer around the insulating layer for contacting a subsea environment.

28. The method of claim 27, wherein at least one of the at least one layer of a plurality of elongated hollow elements further comprises a functional element selected from the group consisting of an elongated heating element, a communications cable, an electrical cable and combinations thereof.

29. A system for maintaining desired thermal properties of a flowing hydrocarbon fluid in a subsea pipeline, comprising:

the apparatus of claim 1 located on a seabed wherein the pipeline has a first end connected to a source of hydrocarbon fluid and a second end connected to a facility for processing hydrocarbon fluid.

30. The system of claim 29, further comprising:

a monitoring system for monitoring a condition associated with the pipeline, wherein at least one of the at least one insulating layer further comprises a cable selected from a communications cable, an electrical cable and combinations thereof extending along at least a portion of the length of the pipeline and connected to the monitoring system at one end of the cable and to a monitoring device at another end of the cable.

31. The system of claim 30, wherein the cable passes through one of the elongated hollow elements.

32. The system of claim 29, wherein at least one of the at least one insulating layer further comprises an elongated heating element extending along at least a portion of the length of the pipeline for providing active heating to the pipeline and wherein the elongated heating element is included in the single layer of the plurality of elongated hollow elements.

33. The system of claim 29, further comprising a female mating interface in fluid communication with at least one of the elongated hollow elements capable of receiving an ROV hot stab for filling or refilling the elongated hollow elements with insulation material.

34. A method for forming a thermally insulated field joint in a subsea pipeline on a floating pipeline installation vessel, comprising:

welding two sections of pipeline on the floating pipeline installation vessel to form a joint having a length;

wrapping the joint with the insulating sheet of the apparatus of claim 8 such that the length of the plurality of elongated hollow elements extend along the length of the joint; and covering the insulating sheet with a protective layer.

* * * * *